(12) United States Patent  (10) Patent No.: US 7,605,693 B2
Kulas  (45) Date of Patent: Oct. 20, 2009

(54) VISUAL INDICATORS ON VEHICLE STEERING WHEEL DISPLAYED IN RESPONSE TO HAND POSITION

(76) Inventor: Charles J. Kulas, 651 Orizaba St., San Francisco, CA (US) 94132

( * ) Notice: Subject to any disclaimer, the term of this patent is extended or adjusted under 35 U.S.C. 154(b) by 261 days.

(21) Appl. No.: 11/468,725

(22) Filed: Aug. 30, 2006

(65) Prior Publication Data

US 2008/0061954 A1 Mar. 13, 2008

(51) Int. Cl.
*B60Q 1/00* (2006.01)
(52) U.S. Cl. ........................... 340/438; 340/439
(58) Field of Classification Search .............. 340/438, 340/439, 459, 461, 462
See application file for complete search history.

(56) References Cited

U.S. PATENT DOCUMENTS

| | | | | |
|---|---|---|---|---|
| 4,572,207 A | * | 2/1986 | Yoshimi et al. ............. | 600/519 |
| 4,664,127 A | * | 5/1987 | Ikeyama ..................... | 600/502 |
| 5,666,102 A | * | 9/1997 | Lahiff ........................ | 340/438 |
| 5,691,695 A | * | 11/1997 | Lahiff ........................ | 340/439 |
| 5,855,144 A | * | 1/1999 | Parada ........................ | 74/552 |
| 6,739,620 B2 | * | 5/2004 | Derrick ...................... | 280/731 |
| 6,812,942 B2 | | 11/2004 | Ribak | |
| 6,857,498 B2 | | 2/2005 | Vitale et al. | |
| 7,278,367 B1 | * | 10/2007 | Gonring et al. ......... | 114/144 R |
| 7,306,499 B2 | * | 12/2007 | Okuyama .................... | 440/87 |

* cited by examiner

*Primary Examiner*—John A Tweel, Jr.
(74) *Attorney, Agent, or Firm*—Perkins Coie LLP

(57) ABSTRACT

Visual indicators on a steering wheel of a vehicle provide information to a driver of the vehicle. In one embodiment an input stage is used to receive an input signal. The signal is processed to provide a signal for an indicator on the steering wheel. Conditions of the steering wheel can be sensed to provide modification of the indicator display. For example, the rotation or orientation of the steering wheel can be taken into account to modify the display for better viewing. The position or placement of a driver's hand on the steering wheel can be used to change the display of indicators so that the indicators are less obscured.

25 Claims, 7 Drawing Sheets

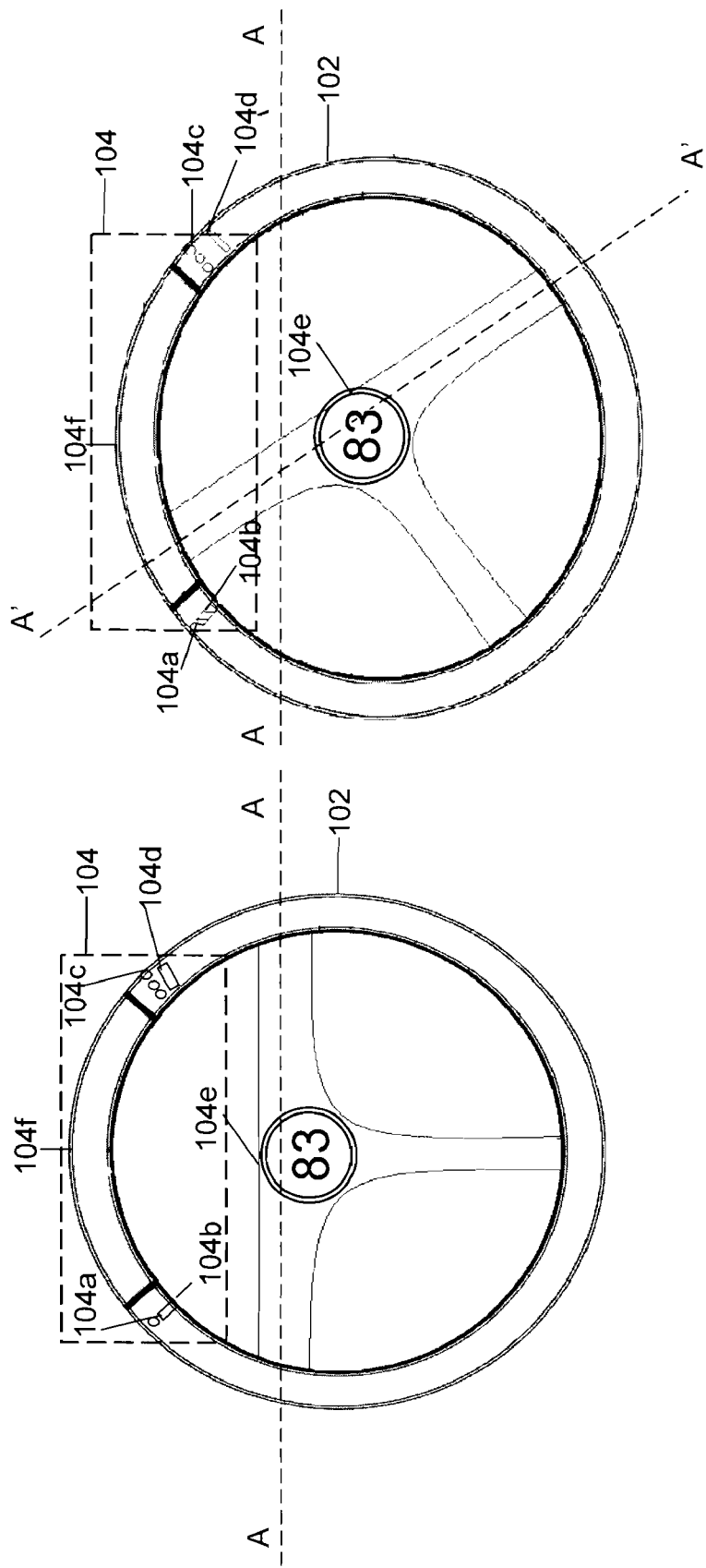

VISUAL INDICATORS ON VEHICLE STEERING WHEEL DISPLAYED IN RESPONSE TO HAND POSITION

BACKGROUND OF THE INVENTION

Embodiments of the invention relate in general to information display systems and more specifically to display systems of vehicles.

Vehicles, such as automobiles, include instrument cluster gauges, displays and other indicators on a "dashboard." The dashboard is typically just below a windshield and in front of the driver and presents operating conditions of the automobile or other information that is of interest to the driver. The dashboard display panel presents various operating conditions with the help of gauges, meters, lights or other types of indicators such as a speedometer, a tachometer, an odometer, a fuel gauge and so forth. In addition, the dashboard display panel includes multiple indicators such as turn light indicators, headlight indicators, engine oil level indicators, among others. These indicators are of various forms and types such as analog or digital, mechanical, electromechanical, electronic, optical, etc.

Conventionally, the dashboard display panel is placed behind a steering wheel in an automobile. Since the dashboard display panel is placed behind the steering wheel, the view of the indicators on the dashboard display panel gets obstructed and they may not be clearly visible to a driver. The view of the indicators may be obscured due to the movement of the steering wheel and the movement of the driver's hand on the steering wheel. As a result, this positioning of indicators on the dashboard display panel can be inconvenient for the driver. An important warning may go unnoticed, leading to various problems. These problems can include exceeding a regulated rate of speed, failing to activate or deactivate a turn indicator, causing the driver to become stranded due to unchecked fuel indications, serious engine damage due to unnoticed dangerous oil pressure, temperature or other warning conditions.

The inability to view the dashboard display panel indicators easily can cause inconvenience and distraction to the driver. A driver may not bother to frequently check an indicator if it is not easily seen. If a driver must move their head, steering wheel, hands or other obstruction; or take other action to view the indicators it could lead to inattentive or hazardous driving.

BRIEF DESCRIPTION OF THE DRAWINGS

FIGS. 4a and 4b illustrate a change in indicators of the steering wheel, in accordance with an exemplary embodiment of the invention.

DETAILED DESCRIPTION OF EMBODIMENTS OF THE INVENTION

Embodiments of the invention provide indicators mounted onto, integrally with, within or adjacent to (i.e., "on" or "onto") a steering wheel. The indicators provide a convenient manner to convey information to a driver of the vehicle.

Various types of indicators can be used to indicate any useful type of information or condition. For example, vehicle operations-related information can include the speed of the vehicle, distance covered by the vehicle, engine temperature, oil level, oil pressure, fuel level, among others. The operations-related information is obtained from various sensors and controls in the vehicle. The operations-related information from the various sensors and controls is received at an input stage where it can be processed for display by one or more indicators.

The information can be conveyed from the sensor to the input stage by any suitable manner such as with hardwired, wireless, optical, etc. links. It will be apparent to one of skill in the art that there are many suitable designs for conveying, processing and displaying the sensed signal or conditions.

In another embodiment, a condition or parameter of the steering wheel, itself, is used as a factor in modifying how information is displayed by the indicators. Examples of steering wheel parameters include, but are not limited to, a degree of rotation of the steering wheel and the position of the driver's hand on the steering wheel. These parameters of the steering wheel can be determined with sensors mounted on or near the steering wheel shaft, perimeter, spokes, hub or elsewhere. These sensors can be position sensors, rotation sensors, hand pressure sensors, hand capacitive sensors, and so forth. Other methods of determining a steering wheel parameter can include infrared or optical sensing or imaging, assumption or prediction of driver hand placement according to wheel position. In such cases the sensors or other mechanisms for sensing steering wheel rotation or hand placement can be located in any convenient place and can be of any suitable design. In a particular embodiment, the determined parameters are sent to a processing unit in the input stage. The processing of the input signal is based on the determined parameters for the generation of a display output. Subsequently, the display output is sent to the indicators for display on the steering wheel.

Figure 1:
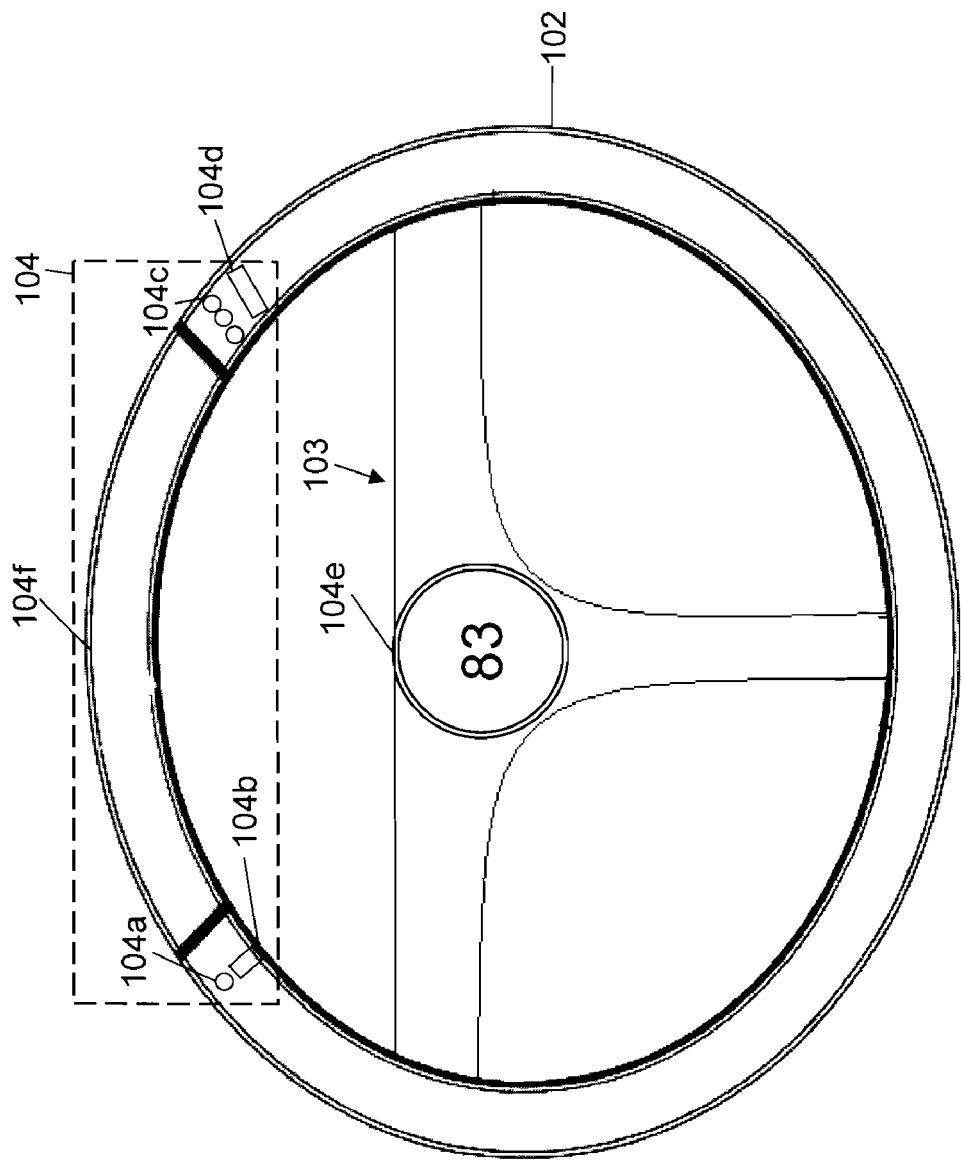
FIG. 1 illustrates a steering wheel in accordance with an exemplary embodiment of the invention.

Referring now to the drawings, particularly by their reference numbers, FIG. 1 illustrates steering wheel 102 in accordance with an exemplary embodiment of the invention. Steering wheel 102 helps in the navigation of the vehicle. Steering wheel 102 includes multiple indicators such as indicators 104a-f. Indicators 104a-f display an indication of a condition in response to an input signal. Indicators 104a-f include left-turn indicator 104a, right-turn indicator 104b, fuel-level warning indicator 104c, warning indicator 104d, distance indicator 104e, and speed indicator 104f. Left-turn indicator 104a and right-turn indicator 104b show turn signals. Fuel-level warning indicator 104c provides the level of fuel in the vehicle. Similarly, warning indicator 104d indicates warnings such as the engine oil level, the engine oil pressure, headbeams, low-beams, fog lamps, rear-position, emergency brakes, door-locks, and so forth. Distance indicator 104e presents the distance covered by the vehicle. Speed indicator 104f shows the speed of the vehicle. The description provided herein is not limited only to indicators 104. Other indicators, gauges, and meters used for displaying information or conditions could similarly be used. For example, outside air temperature or humidity, direction, global positioning system (GPS) data, etc., can be indicated. In general, operations-related information such as speed of the vehicle, distance covered by the vehicle, turn-signal indication, and condition of an engine of the vehicle, etc. can be indicated. Any number and type of conditions, values, or data can be indicated. Additional information, such as identification of units such as kilometers ("km"), miles per hour ("mph"), and the like can be included.

In accordance with an embodiment of the invention, indicators 104 are placed at the top-center of steering wheel 102. Note that placement of indicators in other embodiments can be at different places on the steering wheel.

Figure 2:
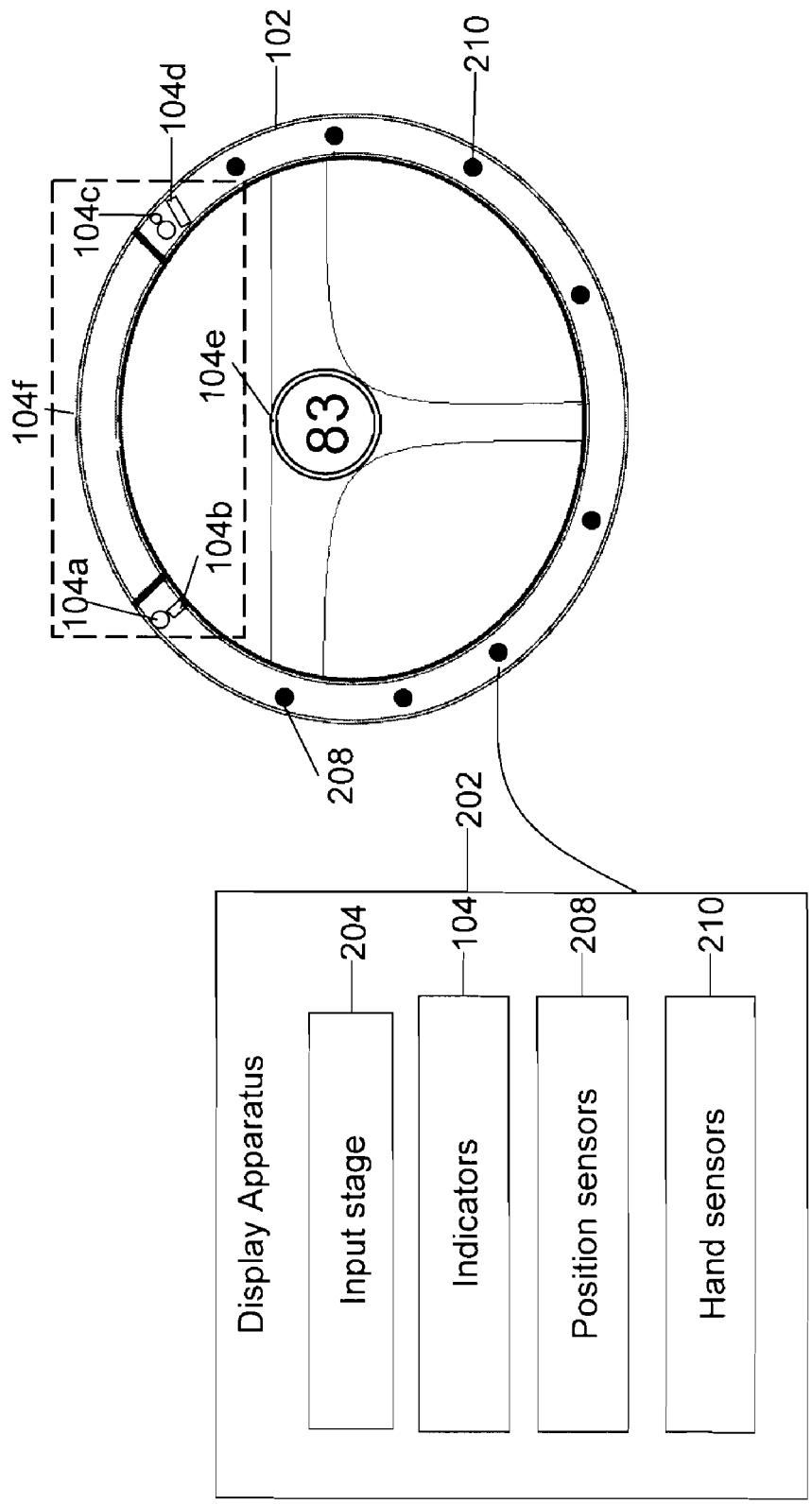
FIG. 2 illustrates a display apparatus, in accordance with an exemplary embodiment of the invention.

FIG. 2 illustrates display apparatus 202, in accordance with an exemplary embodiment of the invention. Display apparatus 202 includes input stage 204, multiple indicators such as indicators 104, position sensors 208, and hand sensors 210. The indication of the condition is selectively displayed among the multiple indicators. The input signal conveys the operations-related information of the vehicle. The input signal is received by input stage 204. Input stage 204 receives the input signal about a condition. In accordance with an embodiment of the invention, input stage 204 is placed on a column of steering wheel 102.

Position sensors 208 and hand sensors 210 determine the parameters on steering wheel 102. Examples of position sensors 208 and hand sensors 210 include, but are not limited to, photo-detectors, infra-red sensors, proximity sensors, temperature sensitive resistors, electroluminescent sensors, light emitting diode sensors, organic light emitting diode (OLED) sensors, optical, electrical resistance sensors, magnetic sensors, pressure sensors, position sensors, orientation sensors, rotation sensors, and tactile capacitive sensors. Position sensors 208 determine the degree of rotation of steering wheel 102. Hand sensors 210 determine the change in the hand-position of the driver.

In accordance with an embodiment of the present invention, position sensors 208 and hand sensors 210 are distributed evenly on steering wheel 102. Position sensors 208 and hand sensors 210 can be placed on the front or the back face of steering wheel 102 or in any desired position, frequency and arrangement.

Input stage 204 processes the operations-related information of the vehicle. The operations-related information also includes information regarding the parameters of steering wheel 102. Examples of the parameters of steering wheel 102 include, but are not limited to, the degree of rotation of steering wheel 102, the hand-position of a driver of the vehicle, etc. While processing, the input signal is used to generate a display output. Subsequently, indicators 104 display the display output.

Display apparatus 202 can be included on the steering wheel assembly. This may be desirable, for example, where wireless communications are used to convey signals from sensors to input stage 204. In other embodiments, all or a portion of display apparatus 202 can be included within the dashboard or other part of the vehicle. This may be desirable if display apparatus 202 is large or consumes significant power. Note that the design of display apparatus 202 and specific components, subsystems, or other parts of the display apparatus or overall system can vary in different embodiments. Portions of the functionality can be performed in different places and at different times so that they differ from those described herein.

In accordance with another embodiment of the invention, parts of the system, such as display apparatus 202 and the indicators can be provided on a flexible material that is attached to a steering wheel at a time after manufacture of the vehicle. For example, the flexible material can be attached to steering wheel 102 as an after-market purchase. Display apparatus 202 and sensors can be sold as a "sheath" with which to wrap around steering wheel 102 in such a manner that it can be attached or detached to steering wheel 102 when required. In this case, wireless links from the sensors and other circuitry in the vehicle would preferably be used. These signals could be preset by a manufacturer of the vehicle to convey the sensor information to transmission stage 302 as described below. Examples of the flexible material include, but are not limited to, plastic, polythene, rubber, leather, etc. Other flexible materials that can be used will be apparent to a person ordinarily skilled in the art.

Figure 3:
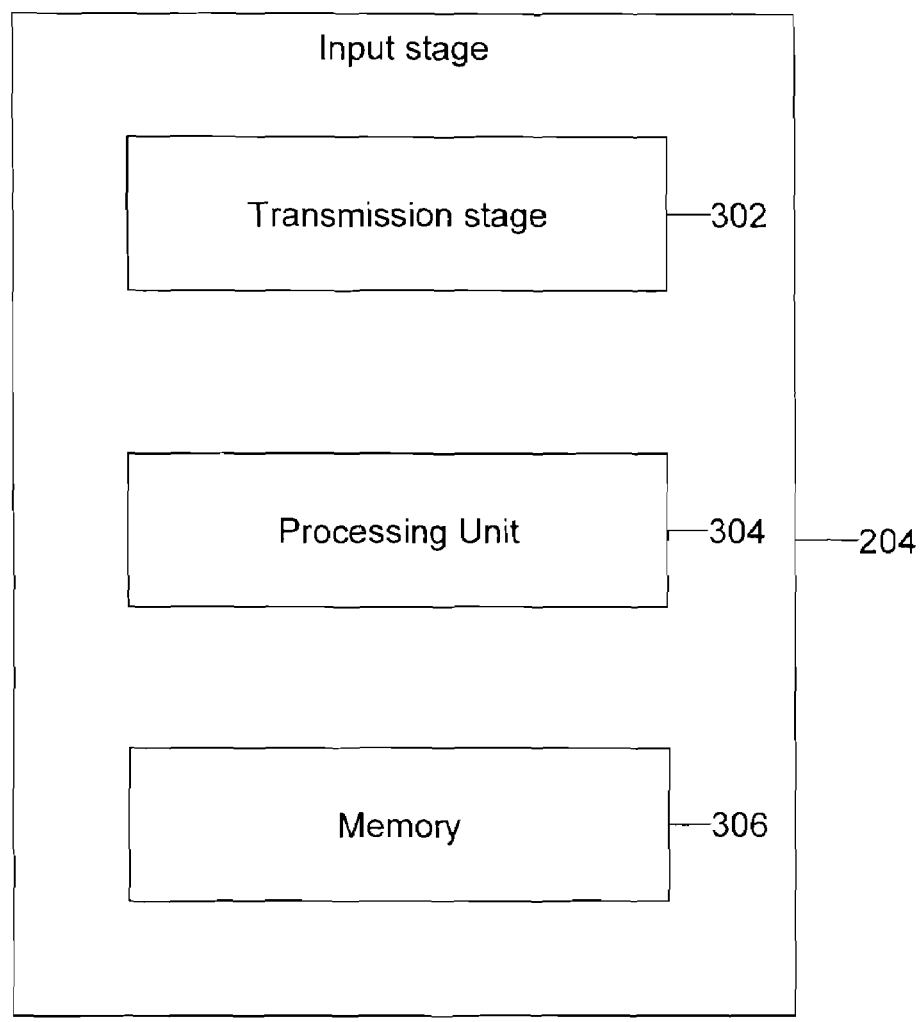
FIG. 3 illustrates an input stage, in accordance with an exemplary embodiment of the invention.

FIG. 3 illustrates input stage 204, in accordance with an exemplary embodiment of the invention. Input stage 204 includes transmission stage 302, processing unit 304, and memory 306.

Transmission stage 302 receives the input signal conveying the operations-related information of the vehicle. The input signal is received from various sensors and controls in the vehicle. In an embodiment of the invention, the transmission stage 302 is a wireless transmission stage. Examples of the wireless transmission stage include, but are not limited to, Bluetooth, radio frequency-based wireless transmission stage, infra-red based wireless transmission stage, laser-based wireless transmission stage, etc. Other wireless standards that can be employed are Bluetooth, DECT (Digital Enhanced Cordless Telecommunications), DSRC (Dedicated Short Range Communications), HIPERLAN (High Performance Radio LAN), Infrared Data Association (IrDA), and so forth. Alternatively, hardwired, fiber optic, etc. types of connections can also be used in place of, or in concert with, wireless communications.

Processing unit 304 processes the received input signal. While processing, the input signal of the vehicle is collated to generate display output. Memory 306 stores the processed input signal. Therefore, the input signal of the vehicle can be retrieved when required. In accordance with an embodiment of the invention, memory 306 is a Random Access Memory (RAM). The RAM temporarily stores the processed operations-related information of the vehicle. In another embodiment of the invention, memory 306 is a non-volatile memory that stores information for a long duration. The stored input signal is then sent to indicators 104 for display. Other embodiments can use different designs and need not use all of the components described herein. For example, an input stage may be a hardwired circuit and need not have a processor and memory.

FIGS. 4a and 4b illustrate a change in indicators 104 of steering wheel 102, in accordance with an exemplary embodiment of the invention. In FIGS. 4a and 4b, axis A-A represents a horizontal axis of steering wheel 102. Indicators 104 are displayed at the top of steering wheel 102. In FIG. 4b, axis A'-A' represents the position of steering wheel 102 when it is rotated clockwise to turn the vehicle. Due to the clockwise rotation on turning the vehicle, the degree of rotation of steering wheel 102 changes. The degree of rotation is the angle between axis A-A and axis A'-A'. The degree of rotation is determined by position sensors 208.

In accordance with an embodiment of the present invention, position sensors 208 comprise the rotation detectors coupled to the shaft of steering wheel 102. Further, the determined degree of rotation of steering wheel 102 by rotation detectors is sent to processing unit 304 for generating display output. As a result of the processing, indicators 104 are shifted and readjusted such that they remain viewable at the top of steering wheel 102.

This approach requires that the displayable area for the indicators is over a relatively large, or entire, portion of the steering wheel's surface. For example, an LCD surface can be used over substantially the entire surface of steering wheel 102 that is easily visible to the driver. Rotation can also cause other parts of the display, such as the speed indicator at the hub of steering wheel 102, to adjust accordingly so that they always appear correctly such as the right-side of steering wheel 102 is always on top. Other ways to do steering wheel position and rotation sensing are possible. For example, a gravity switch or sensor, inertial position, velocity or acceleration sensor, among others can be employed.

Figure 5A:
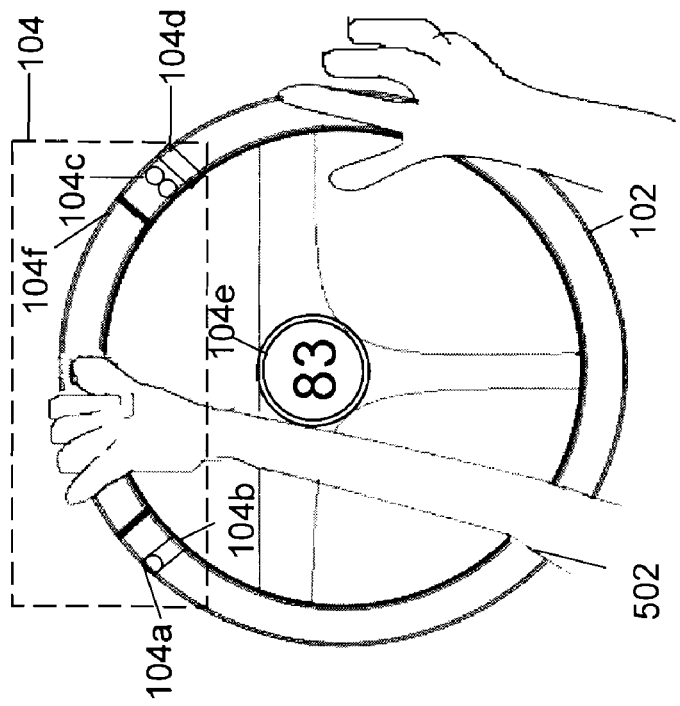
FIGS. 5a and 5b illustrate a change in indicators of steering wheel, in accordance with another exemplary embodiment of the invention.
Figure 5B:
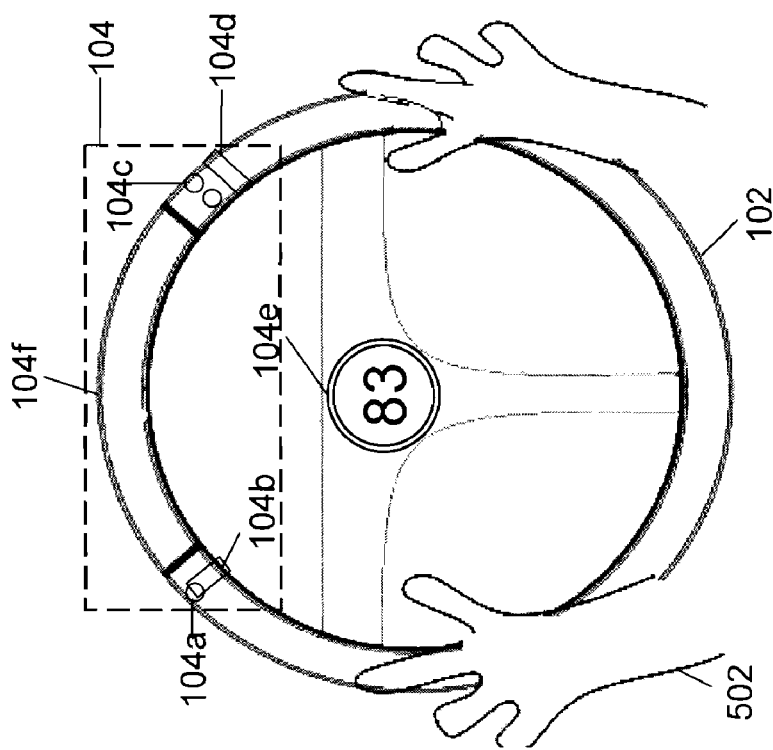

FIGS. 5a and 5b illustrate a change in the position of indicator 104f on steering wheel 102, in response to a change in a driver's hand placement. In this embodiment, the change in indicator position is due to the change in placement of driver's hand 502 as opposed to a rotation of steering wheel 102. FIG. 5a represents the initial position of hands 502 of the driver. In such a position, indicators 104f are visible at the top of steering wheel 102. When the position of hand 502 changes, sensors 210 (of FIG. 2) determine the new position of hand 502 on steering wheel 102. The position of hand 502 can be determined using optical sensors, thermal sensors, pressure sensors, infrared sensors, resistive sensors, capacitive sensors, and so forth. Sensors such as capacitive sensor, hand sensors (pressure sensors), infrared sensor, and optical sensor can be placed along the circumference or perimeter of steering wheel 102 where it is usually gripped by a driver. Subsequently, processing unit 304 processes the determined new position of hand 502 of the driver to detect that the driver's hand is now obscuring indicator 104f. As a result, the position of indicator 104f is shifted to the right and readjusted in such a manner that it is more visible at a position as shown in FIG. 5b. Only indicators that are obscured need to be shifted and generally it is desirable to shift or move the indicators as little as possible to make them visible. However, other embodiments can move more or less of the displayed indicators as much or as little as desired. Other indicators that are not obscured can remain at their initial positions. Alternatively, some of these non-obscured indicators can also be moved as, for example, where a block of indicators are moved in order to maintain their visual relationship with each other for easier driver readability.

Indicators 104 can be included on a touch-sensitive display screen, thus allowing both the display of indicators 104 and detection of a driver's hand placement by pressure or touch sensing. Examples of a touch screen include, but are not limited to a liquid crystal touch screen, plasma display touch screen, and infra-red touch screen. Embodiments that do not integrate the display with a touch screen are also possible such as where a touch pad, discrete buttons, contacts, pressure sensors, etc., are used.

In accordance with an embodiment of the present invention, the touch screen is a liquid crystal touch screen. When the position of the driver's hands 502 changes on the liquid crystal touch screen, position sensors 208 and hand sensors 210 mounted on the liquid crystal touch screen determine the change. Subsequently, the determined change is sent to processing unit 304 for processing. As a result of the processing, the position of indicators 104 is shifted and readjusted in such a manner that indicators 104 are viewable at a suitable position between hands 502 of the driver.

Figure 6:
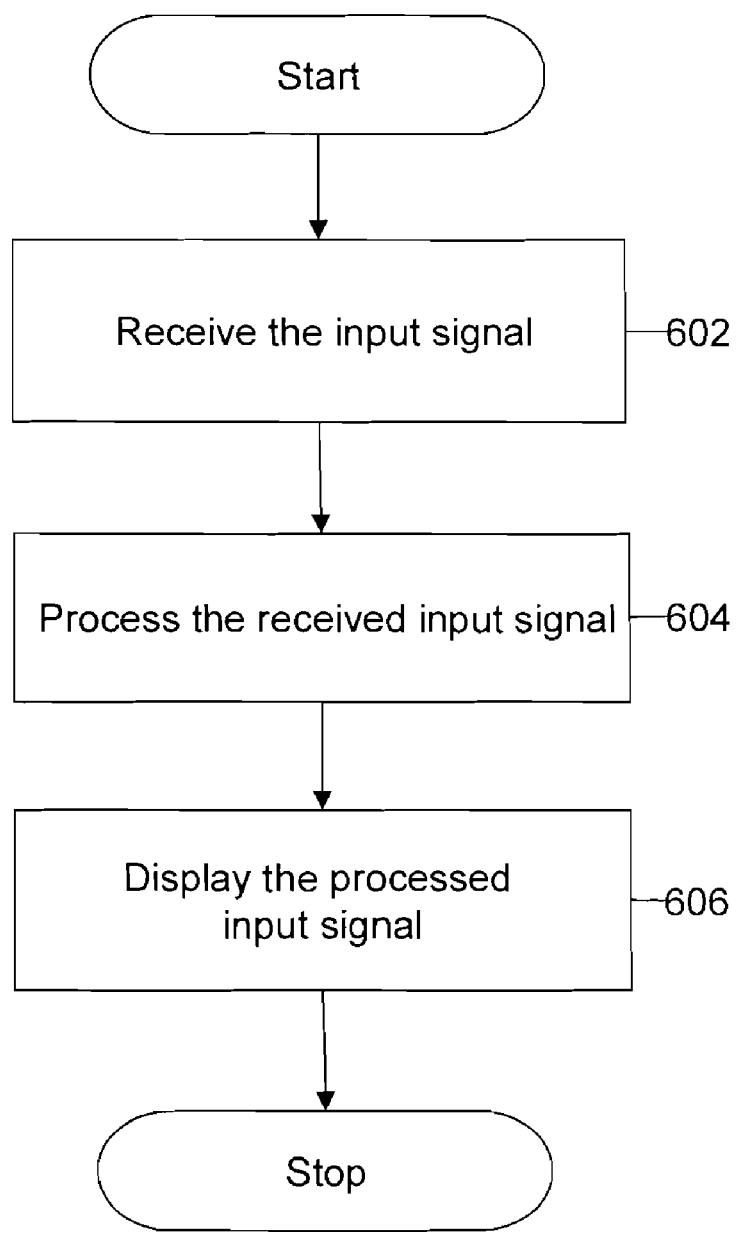
FIG. 6 illustrates a method for displaying operations-related information of a vehicle, in accordance with an exemplary embodiment of the invention.

FIG. 6 illustrates a method for displaying operations-related information of a vehicle, in accordance with an exemplary embodiment of the invention. At 602, the input signal is received at transmission stage 302 in input stage 204. The input signal conveys the operations-related information of the vehicle. The operations-related information is received from various sensors and controls inside the vehicle. Thereafter, the received input signal from transmission stage 302 is sent for processing to processing unit 304. At 604, the received input signal is processed. During processing, the input signal is collated to generate display output. The display output from processing unit 304 is stored in memory 306. The display output is then sent from memory 306 to indicators 104. At 606, the display output comprising the processed input signal is displayed on indicators 104. Thereafter, the input signal is easily viewable to the driver at steering wheel 102.

Figure 7:
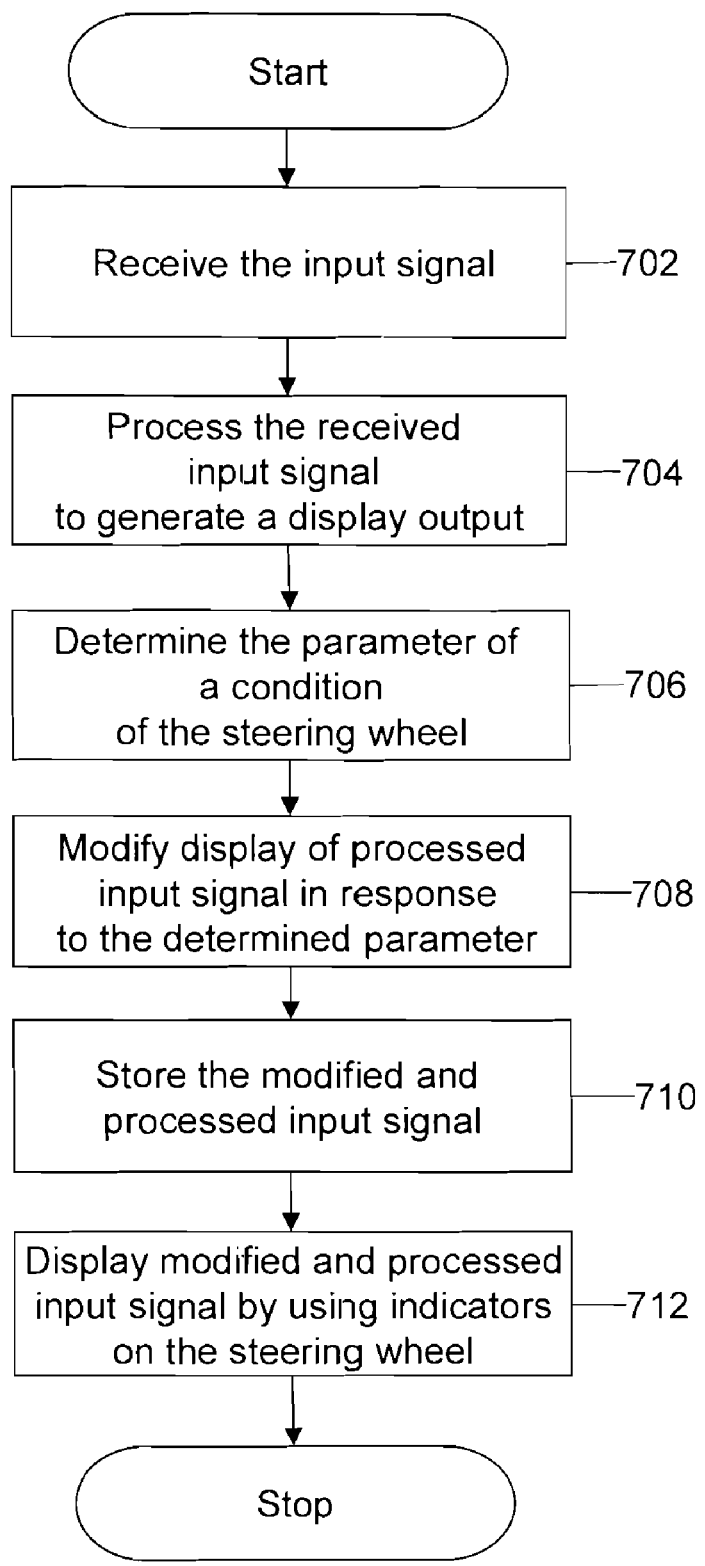
FIG. 7 illustrates a method for displaying operations-related information of a vehicle, in accordance with another exemplary embodiment of the invention.

FIG. 7 illustrates a method for displaying operations-related information of a vehicle, in accordance with another exemplary embodiment of the invention. At 702, the input signal comprising the operations-related information (e.g., information about a condition of the vehicle) is received by transmission stage 302 in input stage 204. At 704, the received input signal is processed by processing unit 304 to generate a display output. Subsequently, at 706, parameters of a condition on the vehicle are determined by position sensors 208 and hand sensors 210. These parameters are also sent to transmission stage 302 in input stage 204. Further, at step 708 the display of processed input signals is modified in response to the determined parameters of the condition on the vehicle. Based on the modification, indicators 104 are readjusted and shifted in such a manner that in spite of the changes occurring on steering wheel 102, indicators 104 remain easily viewable by the driver. Moreover, at 710, the modified display of processed input signals is stored in memory 306. At step 712, the modified and processed input signals are displayed by using indicators 104 on steering wheel 102. Subsequently, the processed input signals upon modification based on the determined parameters of the condition on the vehicle are displayed as a display output on steering wheel 102.

According to various embodiments of the invention, an apparatus for displaying operations-related information of a vehicle is provided. The apparatus comprising an input stage for receiving an input signal, wherein the input signal conveys the operations-related information of the vehicle; and an indicator mounted onto a steering wheel of the vehicle, wherein the indicator is coupled to the input stage and displays the received operations-related information in response to the input signal.

In another embodiment of the invention, a method for displaying operations-related information of a vehicle, the method comprising receiving an input signal, wherein the input signal conveys the operations-related information of the vehicle; processing the received input signal; and displaying the processed input signal.

Various embodiments of the present invention provide an apparatus and a method for displaying operations-related information of the vehicle. The apparatus and the method facilitate providing an unobstructed view of the indicators to the driver.

Various embodiments of the invention provide an apparatus and a method that facilitate efficient visibility of the indicators to the driver when the steering wheel is rotated.

Various embodiments of the invention provide an apparatus and a method that facilitate efficient visibility of the indicators to the driver due to change in the position of hands of the driver.

Various embodiments of the invention provide an apparatus and a method that provide indicators placed on a flexible material. The flexible material can be wound around the steering wheel and is detachable.

Various embodiments of the invention provide a display apparatus that can be utilized in various video-games, electronic display mediums and racing vehicles.

Various embodiments of the invention provide an apparatus and a method that facilitate in providing a configuration of the indicators on the steering wheel that can be customized and personalized by the driver as per personal requirement.

Various embodiments of the invention provide an apparatus and a method that facilitate in providing user-friendly indicators mounted on the steering wheel.

Although the invention has been discussed with respect to specific embodiments thereof, these embodiments are merely illustrative, and not restrictive, of the invention. For example, indicators can be placed anywhere on the surface of a steering wheel where that surface is, or becomes, visible to a driver. The steering wheel's perimeter, hub, spokes, etc., can all be applied with indicators. In some steering wheel designs there may be considerable viewable surface at the top surface of a horizontal spoke as shown in FIG. 1 at 103. This is not easily visible in the two-dimensional image of FIG. 1. However, such a surface may extend from the front surface of steering wheel 102 away from the driver towards the front of the vehicle.

In the description herein, numerous specific details are provided, such as examples of components and/or methods that provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or so forth. In other instances, well-known structures, materials, or operations are not specifically shown or described in detail to avoid obscuring aspects of embodiments of the present invention.

Any suitable programming language can be used to with the present invention including C, C++, Java, PL/I, assembly language, etc. Different programming techniques can be employed such as procedural or object oriented. The routines can execute on a single processing device or multiple processors. Although the printed format (e.g., flowcharts, diagrams, text, etc.) demands that the steps be presented in a specific order, this order may be changed. Multiple steps can be performed at the same time. The sequence of steps can be interrupted. The routines can operate in an operating system environment or as stand-alone routines occupying all, or a substantial part, of the system processing.

Steps can be performed by hardware or software, as desired. Note that steps can be added to, taken from or modified from the steps presented in this specification without deviating from the scope of the invention. In general, the descriptions only indicate one possible sequence of basic operations to achieve a function.

Reference throughout this specification to 'one embodiment', 'an embodiment', or 'a specific embodiment' means that a particular feature, structure, or characteristic described in connection with the embodiment is included in at least one embodiment of the present invention and not necessarily in all embodiments. Therefore, respective appearances of the phrases 'in one embodiment', 'in an embodiment', or 'in a specific embodiment' in various places throughout this specification are not necessarily referring to the same embodiment. Further, the particular features, structures or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered a part of the spirit and scope of the present invention.

The foregoing description of illustrated embodiments of the present invention, including what is described in the abstract, is not intended to be exhaustive or to limit the invention to the precise forms disclosed herein. While specific embodiments of and examples for the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Therefore, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention be not considered as limited to the particular terms used in the following claims and/or to the particular embodiment disclosed as the best mode contemplated for carrying out this invention, but that the invention will include any and all embodiments and equivalents falling within the scope of the appended claim.

As used in the description herein and throughout the claims that follow, 'a', 'an', and 'the' includes plural references unless the context clearly dictates otherwise. Also, as used in the description herein and throughout the claims that follow, the meaning of 'in' includes 'in' and 'on' unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/figures should be considered only as, and not limiting, unless otherwise specifically noted. Moreover, the term 'or' as used herein is generally intended to mean 'and/or' unless otherwise indicated. Combinations of components or steps will also be considered as being noted, where terminology is foreseen as rendering the ability to separate or combine is unclear.

Embodiments of the invention may be implemented by using a programmed general purpose digital computer, by using application-specific integrated circuits, programmable logic devices, field-programmable gate arrays, optical, chemical, biological, quantum or nanoengineered systems, components and mechanisms may be used. In general, the functions of the present invention can be achieved by any means as is known in the art. Distributed or networked systems, components and circuits can be used. Communication or transfer of data may be wired, wireless, or by any other means.

A 'processor' or 'process' includes any human, hardware and/or software system, mechanism or component that processes data, signals or other related information. A processor can include a system with a general-purpose central processing unit, multiple processing units, dedicated circuitry for achieving functionality or other systems. Processing need not be limited to a geographic location or have temporal limitations. For example, a processor can perform its functions in 'real time', 'offline', in a 'batch mode', etc. Portions of processing can be performed at different times and at different locations by different (or the same) processing systems.

What is claimed is:

1. An apparatus for displaying information to a vehicle's driver, the apparatus comprising:
    an input stage configured to receive an input signal about a condition;
    a hand sensor configured to determine the position of a hand on the steering wheel; and
    a plurality of indicators spaced along a perimeter portion of a steering wheel of the vehicle,
    wherein the indicators are operably coupled to the input stage and configured to display an indication of the condition in response to the input signal, and
    wherein the indication of the condition is selectively displayed among the plurality of indicators in response to the position of the hand on the steering wheel.

2. The apparatus of claim 1, wherein the indicator includes a light emitting diode.

3. The apparatus of claim 1, wherein the indicator is arranged on a touch screen.

4. The apparatus of claim 3, wherein the touch screen includes a liquid crystal display.

5. The apparatus of claim 1, wherein the information includes outside temperature.

6. The apparatus of claim 1, wherein the information includes operations-related information of the vehicle.

7. The apparatus of claim 6, wherein the operations-related information includes a speed of the vehicle.

8. The apparatus of claim 6, wherein the operations-related information of the vehicle includes a distance covered by the vehicle.

9. The apparatus of claim 6, wherein the operations-related information of the vehicle includes a condition of an engine of the vehicle.

10. The apparatus of claim 6, wherein the operations-related information includes a turn signal indication.

11. The apparatus of claim 6, further comprising:
    a position sensor for determining a degree of rotation of the steering wheel, and
    wherein the received operations-related information is selectively displayed among the plurality of indicators in response to the degree of rotation.

12. The apparatus of claim 11, wherein the received operations-related information is displayed among the plurality of indicators so that the displayed operations-related information maintains substantially the same angular position with respect to a driver of the vehicle as the steering wheel is rotated.

13. The apparatus of claim 11, wherein the position sensor comprises a gravity switch.

14. The apparatus of claim 11, wherein the position sensor comprises a rotation detector coupled to a shaft of the steering wheel.

15. The apparatus of claim 11, wherein the position sensor comprises an infrared sensor.

16. The apparatus of claim 11, wherein the position sensor includes an optical sensor.

17. The apparatus of claim 1, wherein the hand sensor includes a capacitive sensor coupled to a circumference of the steering wheel.

18. The apparatus of claim 1, wherein the hand sensor includes a pressure sensor coupled to the perimeter portion of the steering wheel.

19. The apparatus of claim 1, wherein the hand sensor includes an infrared sensor.

20. The apparatus of claim 1, wherein the hand sensor includes an optical sensor.

21. The apparatus of claim 1, wherein the input stage for receiving the input signal includes:
    a transmission stage configured to receive the input signal from a central control system;
    a processing unit configured to process the received input signal; and
    a memory configured to store the processed input signal.

22. A method for displaying information to a driver of a vehicle, the method comprising:
    receiving an input signal about a condition;
    processing the received input signal;
    determining a position of a hand on a steering wheel and
    displaying the processed input signal using an indicator on the steering wheel of the vehicle in response to the determined position of the hand on the steering wheel.

23. The method of claim 22, further comprising:
    determining a parameter of a condition of the steering wheel; and
    modifying a display of the processed input signal in response to the determined parameter.

24. The method of claim 23, wherein determining the parameter includes determining a degree of rotation of the steering wheel.

25. An apparatus for displaying information to a driver of a vehicle, the apparatus comprising:
    means for receiving an input signal about a condition;
    means for determining the position of a hand on the steering wheel; and
    means for displaying an indication of the condition in response to the input signal, wherein the means for displaying are arranged along a perimeter portion of a steering wheel of the vehicle, and wherein the indication of the condition is selectively displayed among the means for displaying in response to the position of the hand on the steering wheel.

* * * * *